Figure 1:
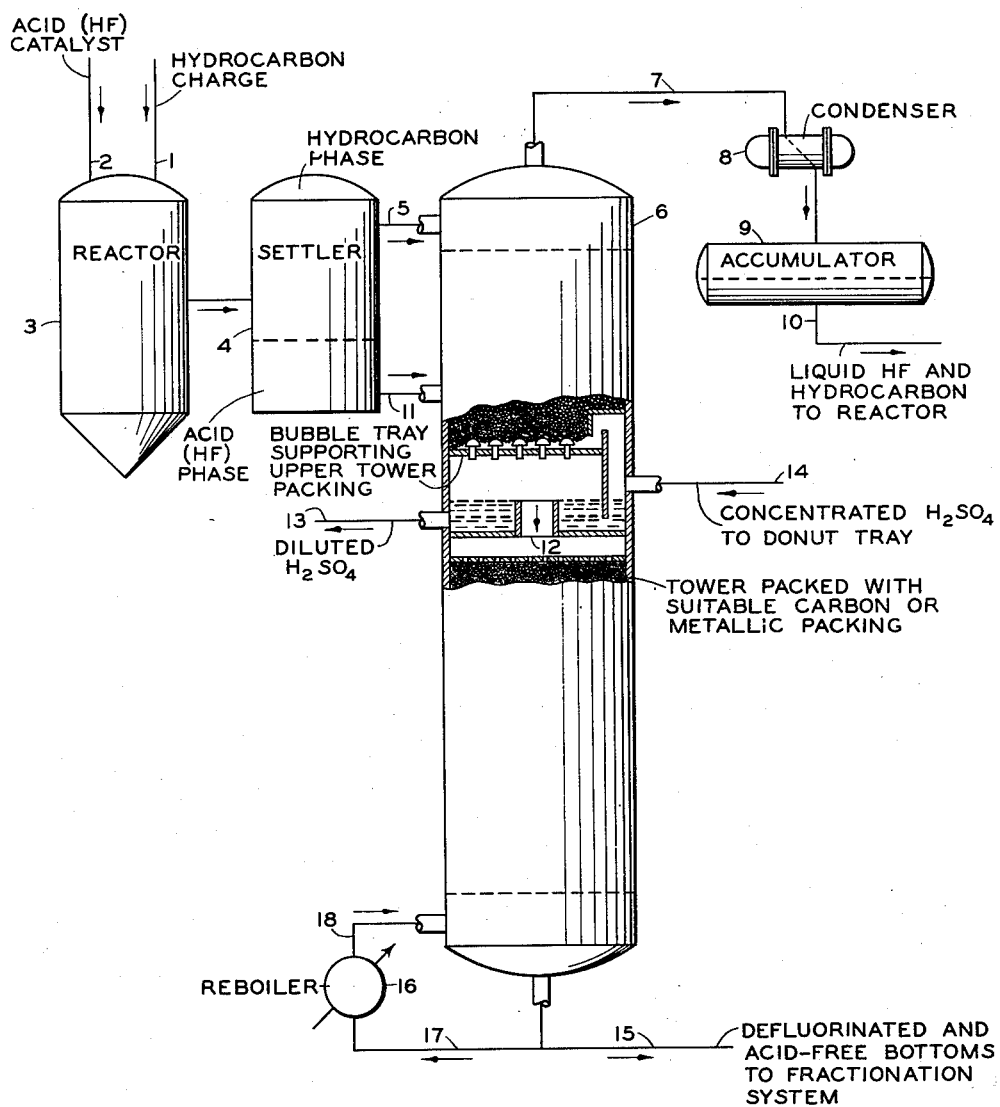

Nov. 6, 1956 G. R. HETTICK 2,769,853
CATALYTIC DEFLUORINATION PROCESS
Filed Sept. 21, 1951 2 Sheets-Sheet 1

INVENTOR.
GEORGE R. HETTICK
BY Hudson and Young
ATTORNEYS

United States Patent Office 2,769,853
Patented Nov. 6, 1956

2,769,853

CATALYTIC DEFLUORINATION PROCESS

George Riley Hettick, Borger, Tex., assignor to Phillips Petroleum Company, a corporation of Delaware Application September 21, 1951, Serial No. 247,735

12 Claims. (Cl. 260—683.4)

This invention relates to the treatment of organic materials to remove therefrom organic fluorine-containing compounds. In one aspect this invention relates to an improved method for the catalytic defluorination of the hydrocarbon products of a hydrocarbon conversion process, e. g. alkylation, isomerization, wherein anhydrous HF is used as a conversion catalyst. In another aspect this invention is concerned with a combination of related and cooperative steps whereby the process of defluorination of the hydrocarbon is more completely and more efficiently performed.

In a process for the conversion of hydrocarbons wherein anhydrous hydrogen fluoride is employed as a catalyst there inevitably occur side reactions in addition to the desired conversion reaction. For example, hydrogen fluoride reacts with some of the hydrocarbons to form organic fluorides. These organic fluorides are, in part, decomposed in the fractionation step, which follows the conversion step, wherein the dissolved hydrogen fluoride is separated from the hydrocarbon conversion product.

The decomposition of the organic fluorides can be further effected by contacting the hydrocarbons, while subjected to the fractionation step, to the action of a defluorination catalyst such as bauxite, carbon or metallic packing materials. These prior art methods for regenerating and recovering dissolved and combined hydrogen fluoride recover the major portion of the hydrogen fluoride but some of the more stable organic fluorides resist the defluorination action and must be removed from the hydrocarbon in a subsequent step.

Hydrogen fluoride has a great affinity for water and forms a constant boiling mixture or azeotrope with water which must be removed from the process to a separate step, commonly referred to as the "acid rerun unit," wherein the water is removed from this mixture.

I have now discovered that the organic fluorides can be more completely decomposed and any hydrogen fluoride-water constant boiling mixture resolved in a unitary process by a novel combination of integrated steps. Thus I have discovered that the hydrocarbon phase from the acid settler of a hydrogen fluoride catalyzed hydrocarbon conversion process can be more completely and more economically freed of organic fluorides and other contaminants in a unitary process by a novel combination of integrated steps. Thus the hydrocarbon phase from the acid settler can be passed to the top of a combined fractionating and defluorinating tower wherein free hydrogen fluoride and low boiling hydrocarbons such as propane are withdrawn overhead as a vapor. I have found that used liquid hydrofluoric acid, containing impurities such as acid (hydrogen fluoride) soluble oils and water, can be withdrawn from the acid phase in the settler and passed, in minor amount, to the defluorination zone of the defluorinator-fractionator and that this used acid will promote the defluorination reaction therein. The fact that this used acid (hydrogen-fluoride) will promote the defluorination is surprising because in the past only pure hydrogen fluoride has been employed for this purpose because it was believed necessary to prevent fouling of the catalyst or contact mass which it was believed would occur if pure acid was not used. Thus I have now found that the acid soluble oils do not have an adverse effect upon the catalyst and are withdrawn from the bottom of the tower with the hydrocarbon product. The water present in the used acid from the acid settler forms a constant boiling mixture with hydrogen fluoride and can be collected in a collector tray located at or near the middle of the defluorinator-fractionator tower and withdrawn as such. I have further found that the hydrogen fluoride-water constant boiling mixture can be resolved in the collector tray by contacting same with concentrated sulfuric acid. Hydrogen fluoride is released and passes up the tower and water is removed in the consequently diluted sulfuric acid.

Thus according to the practice of this invention there is provided an improved unitary process for the removal and recovery of chemically combined hydrogen fluoride present in a liquid hydrocarbon resulting from a hydrogen fluoride catalyzed conversion which comprises adding to a defluorination zone, with said hydrocarbon, a minor portion of used catalyst which has been used in the system and which contains acid soluble oils and water, collecting a constant boiling mixture of hydrogen fluoride and water in a collector tray in the fractionation zone of said defluorination zone and withdrawing said constant boiling mixture from said tray or resolving said mixture on said tray by contact with concentrated sulfuric acid in said tray whereby the hydrogen fluoride is released and the water is removed in the resulting diluted sulfuric acid.

The invention will be more fully described by reference to the accompanying drawing which shows in simplified schematic form two modifications of the invention.

In Figure 1 a suitable hydrocarbon charge is passed through line 1 to reactor 3 and hydrogen fluoride catalyst is passed through line 2 to reactor 3. The effluent of reactor 3 is passed to settler 4 where a phase separation takes place, the heavier acid settling to the bottom and the hydrocarbon phase rising to the top. The hydrocarbon phase is passed from settler 4 through line 5 to the top of the defluorinator-fractionator tower 6. Free hydrogen fluoride and some low boiling hydrocarbons pass overhead through line 7 and condenser 8 to accumulator 9 and are returned through line 10 to reactor 3. Used system acid containing water and catalyst or acid-soluble oils is passed from settler 4 through line 11 to the defluorinator zone of tower 6. Hydrogen fluoride-water constant boiling mixture is collected in collector tray 12 and withdrawn through line 13 or is resolved by concentrated sulfuric acid injected into tray 12 through line 14, resulting diluted sulfuric acid being withdrawn through line 13. Defluorinated hydrocarbon product and acid-soluble oils are withdrawn from the bottom of tower 6 through line 15 and passed to further fractionation (not shown). Reboiler-heater 16 is in communication with the bottom of tower 6 through supply line 17 and return line 18 and serves to maintain the tower bottom at a desired temperature.

Figure 2:
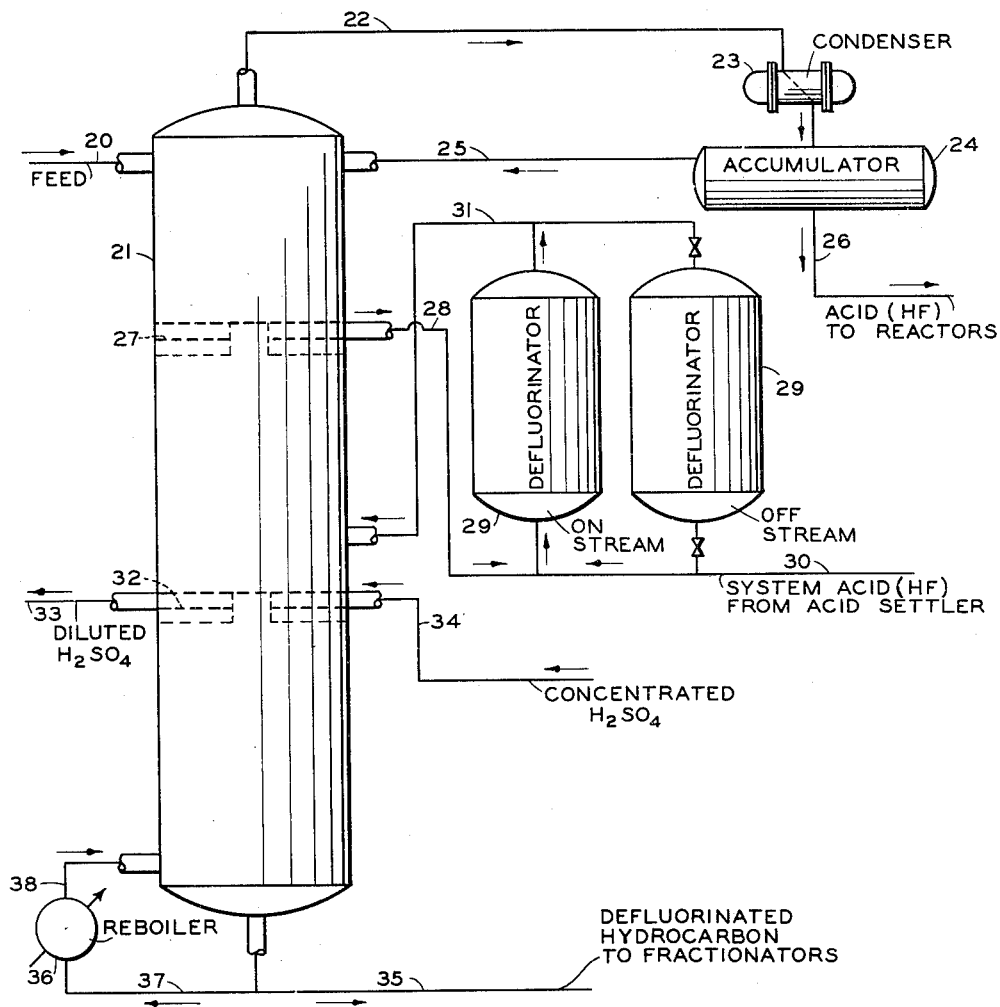

In Figure 2 is shown a modification wherein the defluorination zone is external the fractionation tower. The hydrocarbon phase from the settler (not shown) is passed through line 20 to the top of fractionator tower 21, hydrogen fluoride and a minor portion of low boiling hydrocarbons pass overhead through line 22, condenser 23 to accumulator 24. A phase separation occurs in accumulator 24, the hydrocarbon phase is returned through line 25 to the top of tower 21 and the hydrogen fluoride phase is returned through line 26 to the reactor (not shown).

Liquid hydrocarbons containing organic fluorides are withdrawn from collector tray 27 located near the top of tower 21, passed through line 28 to defluorinator 29. Used system hydrogen fluoride containing water and catalyst-soluble oils is passed from the acid settler (not shown) to defluorinator 29 through line 30. The effluent of defluorinator 29 comprising hydrocarbon, hydrogen fluoride, catalyst soluble oils and water is returned through line 31 to tower 21 at a point below collector tray 27.

Hydrogen fluoride-water constant boiling mixture is collected in collector tray 32 and is withdrawn through line 33 or is resolved in tray 32 by contact with concentrated sulfuric acid introduced into tray 32 through line 34, resulting diluted sulfuric acid being withdrawn through line 33.

Defluorinated hydrocarbon product and catalyst-soluble oils are withdrawn from the bottom of tower 21 through line 35 and passed to further fractionation (not shown). Reboiler-heater 36 is in communication with the bottom of tower 21 through supply line 37 and return line 38 and serves to maintain the tower bottom at a desired temperature.

The temperature maintained in the fractionator and defluorinators can be in the range 150 to 300° F. and the pressure being that necessary to maintain liquid in the bottom of the fractionator, for example in the range of atmospheric to 500 p. s. i. depending upon the hydrocarbon liquid being defluorinated.

In one example of the operation of my invention 100 barrels per hour of hydrocarbon liquid from the acid settler of a hydrogen fluoride catalyzed process for alkylation of isobutane with butenes was passed to the top tray of a combined fractionator and defluorinator tower, 2 barrels per hour of acid (hydrogen fluoride contaminated with water and catalyst soluble oils, was injected into the side of the defluorinating zone of the tower, 12 barrels per hour of a mixture of free hydrogen fluoride and a minor amount of low boiling hydrocarbons was condensed as the overhead product of the tower and returned to the reactor, and 90 barrels per hour of a mixture of defluorinated hydrocarbon liquid and a minor amount of catalyst soluble oils was withdrawn from the bottom of the tower and passed to further fractionation.

I have found that through the practice of this invention the following advantages are achieved:

(1) the elimination of the acid (HF) rerun unit,
(2) acid (HF) soluble oils can be recovered in the fractionating system without neutralization or other special handling, and
(3) elimination of light hydrocarbons from the acid (HF).

Other advantages will be apparent to those skilled in the art upon reading the specification and drawing to the invention.

Reasonable variation and modification are possible within the scope of the disclosure of the invention the essence of which is that used system hydrogen fluoride (acid) containing water and catalyst soluble oils can be used to promote the defluorination reaction, the resulting hydrogen fluoride-water constant boiling mixture can be collected in a collector tray and therein contacted with concentrated sulfuric acid, releasing free hydrogen fluoride and retaining the water in the sulfuric acid which is withdrawn. The hydrogen fluoride-water mixture can also be withdrawn as such from the collector tray.

I claim:

1. In the defluorination of organic materials containing combined fluorine and hydrocarbons which comprises contacting said materials with a solid defluorinating catalyst selected from the group consisting of bauxite, carbon, and metallic packing at a temperature in the range of 150 to 300° F., and at a pressure in the range of atmospheric to 500 p. s. i., the improvement which comprises introducing to said catalyst, hydrogen fluoride resulting from a hydrocarbon conversion operation in which said hydrogen fluoride has been used as a hydrocarbon conversion catalyst and as a result of which use said hydrogen fluoride now contains hydrogen fluoride soluble oils and water as the sole step of separating hydrogen fluoride from hydrogen fluoride-soluble oils.

2. In the removal of hydrogen fluoride and organic fluorine compounds from a hydrocarbon conversion effluent product employing hydrogen fluoride as a catalyst which comprises distilling said hydrocarbon containing effluent in a distillation zone, recovering readily distillable hydrogen fluoride and hydrocarbons in said effluent as a vapor and contacting the remaining liquid hydrocarbons with a solid defluorination catalyst selected from the group consisting of bauxite, carbon, and metallic packing at a temperature in the range 150 to 300° F., and a pressure in the range from atmospheric to 500 p. s. i. g. in a defluorination zone, the improvement which comprises adding to said defluorination zone used hydrogen fluoride catalyst, containing dissolved water and hydrogen fluoride catalyst soluble oils resulting from the employ of the said second mentioned hydrogen fluoride in said hydrocarbon conversion, so as to facilitate and to improve the defluorination effected in said defluorination zone and to separate hydrogen fluoride catalyst from hydrogen fluoride-soluble oils introduced to said zone; and passing the thus treated hydrocarbon together with said added hydrogen fluoride catalyst to said distillation zone.

3. A process according to claim 2 wherein the treated hydrocarbon and catalyst soluble oils are withdrawn from the bottom of the distillation zone.

4. A process according to claim 2 wherein a hydrogen fluoride-water azeotrope which is present in said distillation zone as a result of the process steps effected, is collected in a collection zone at an intermediate portion of and within said distillation zone.

5. A process according to claim 2 wherein a hydrogen fluoride-water azeotrope which is present in said distillation zone as a result of the process steps effected is collected in a collection zone at an intermediate portion of and within said distillation zone and is removed from said distillation zone by withdrawing said azeotrope as such from said collecting zone.

6. A process according to claim 2 wherein a hydrogen fluoride-water azeotrope which is present in said distillation zone as a result of the process steps effected is collected in a collection zone within said distillation zone and is removed from said collecting zone by adding to said collecting zone concentrated sulfuric acid so as to decompose said azeotrope into hydrogen fluoride and water and withdrawing dilute sulfuric acid thus formed from said collecting zone.

7. A process according to claim 2 wherein the hydrocarbon conversion is the alkylation of an isoparaffin with an olefin.

8. A process according to claim 2 wherein the hydrocarbon conversion is the isomerization of a normal paraffin to a branched-chain paraffin.

9. A process according to claim 2 wherein the used hydrogen fluoride added to said defluorination zone is about 2 volume percent of the hydrocarbon conversion effluent product.

10. In the removal of hydrogen fluoride and organic fluorine compounds from a product of a hydrogen fluoride catalyzed hydrocarbon conversion process which comprises distilling said product in a distillation zone, recovering hydrogen fluoride and hydrocarbons boiling in the hydrogen fluoride range as a vapor, contacting remaining hydrocarbons having boiling points substantially above that of hydrogen fluoride with a solid defluorination catalyst selected from the group consisting of bauxite, carbon, and metallic packing at a temperature in the range 150 to 300° F. and a pressure in the range of atmospheric to 500 p. s. i. g. in the distillation zone the improvement which comprises separating in said distillation zone hydrogen fluoride from hydrogen fluoride-soluble oils contained in a minor portion of used hydrogen fluoride catalyst by adding to said distillation zone said minor portion of used hydrogen fluoride catalyst, containing dissolved water and hydrogen fluoride soluble oils resulting from the employment of said hydrogen fluoride as a catalyst in said hydrocarbon conversion; removing a hydrogen fluoride-water azeotrope from said distillation zone; and removing hydrocarbons, having boiling points substantially above that of hydrogen fluoride and being substantially free of organic fluorides, as a liquid from said distillation zone as a product of the process.

11. A process, according to claim 10, wherein the hydrogen fluoride-water azeotrope is removed from said distillation zone by collecting said azeotrope in a collector zone at an intermediate portion of said distillation zone; introducing concentrated sulfuric acid to said azeotrope in said collector zone so as to decompose said azeotrope into hydrogen fluoride and water; and withdrawing dilute sulfuric thus formed.

12. In a hydrocarbon conversion process using hydrogen fluoride as a catalyst, the improvement comprising distilling a resulting total hydrocarbon conversion effluent product so as to remove free hydrogen fluoride as a vapor; passing unvaporized hydrocarbon into contact with a solid defluorination catalyst selected from the group consisting of bauxite, carbon, and metallic packing at a temperature in the range 150 to 300° and a pressure in the range of atmospheric to 500 p. s. i. g. in a defluorination zone; introducing used hydrogen fluoride recovered from said hydrocarbon conversion, and containing hydrogen fluoride-soluble oils and water, into said defluorination zone in sufficient amount so as to activate the defluorination of organic fluorine compounds in a catalytic defluorination zone under defluorination conditions; simultaneously separating in said defluorination zone hydrogen fluoride from hydrogen fluoride-soluble oils contained in said used hydrogen fluoride as the sole hydrogen fluoride/hydrogen fluoride-soluble oil separating step of the process; and recovering hydrogen fluoride-free hydrocarbon from said defluorination zone.

References Cited in the file of this patent

UNITED STATES PATENTS

| | | |
|---|---|---|
| 2,451,568 | Linn | Oct. 19, 1948 |
| 2,458,044 | Alexander | Jan. 4, 1949 |
| 2,532,492 | Giachetto et al. | Dec. 5, 1950 |
| 2,636,912 | Leatherman | Apr. 28, 1953 |
| 2,661,266 | Friden et al. | Dec. 1, 1953 |
| 2,661,319 | Shire | Dec. 1, 1953 |